(12) United States Patent
Buchanan et al.

(10) Patent No.: US 10,776,135 B2
(45) Date of Patent: Sep. 15, 2020

(54) AUTOMATED SETTING CUSTOMIZATION USING REAL-TIME USER DATA

(71) Applicant: INTERNATIONAL BUSINESS MACHINES CORPORATION, Armonk, NY (US)

(72) Inventors: Karen C. Buchanan, Dublin, OH (US); Garrett Hamers, Redmond, WA (US); Alexander T. Mann, Columbus, OH (US); Daniel A. Thau, Dayton, OH (US); Alexander Xu, Dublin, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 15/817,371

(22) Filed: Nov. 20, 2017

(65) Prior Publication Data
US 2019/0155617 A1 May 23, 2019

(51) Int. Cl.
*G06F 9/445* (2018.01)
*G06F 16/9535* (2019.01)
(Continued)

(52) U.S. Cl.
CPC ........ *G06F 9/4451* (2013.01); *G06F 16/9535* (2019.01); *G06F 17/18* (2013.01);
(Continued)

(58) Field of Classification Search
None
See application file for complete search history.

(56) References Cited

U.S. PATENT DOCUMENTS 6,505,161 B1   1/2003  Brems
7,680,745 B2   3/2010  Hunter
(Continued)

OTHER PUBLICATIONS

Biadsy, "Automatic Dialect and Accent Recognition and its Application to Speech Recognition", https://academiccommons.columbia.edu/catalog/ac%3A131456, Columbia University, 2011, 190 pages.
(Continued)

*Primary Examiner* — Kim Huynh
*Assistant Examiner* — Joshua Neveln
(74) *Attorney, Agent, or Firm* — Brian Restauro; Andrew D. Wright; Roberts, Calderon, Safran & Cole, P.C.

(57) ABSTRACT

Systems and methods for automated device setting customization based on user characteristic data are disclosed. In embodiments, a computer-implemented method comprises: receiving, by a computing device, real-time user characteristic data; determining whether the user is a known user of the computing device based on the real-time user characteristic data; identifying one or more characteristics of the user based on the real-time user characteristic data; determining a statistical confidence level of the one or more characteristics of the user; determining that the statistical confidence level meets a predetermined threshold value; and automatically changing a plurality of user configurable settings of the computing device based on the one or more characteristics of the user and in response to the determining that the statistical confidence level meets the predetermined threshold value.

18 Claims, 3 Drawing Sheets

(51) Int. Cl.
  *G06K 9/00*   (2006.01)
  *G06F 17/18*  (2006.01)
  *G10L 17/00*  (2013.01)

(52) U.S. Cl.
  CPC ..... *G06K 9/00013* (2013.01); *G06K 9/00335* (2013.01); *G10L 17/00* (2013.01)

(56) References Cited

U.S. PATENT DOCUMENTS

| | | | |
|---|---|---|---|
| 8,433,372 B2 | 4/2013 | Pasquero et al. | |
| 10,057,125 B1* | 8/2018 | Roman | H04W 8/005 |
| 2004/0064597 A1* | 4/2004 | Trewin | G06F 8/656 |
| | | | 710/8 |
| 2005/0028165 A1* | 2/2005 | McGowan | G06F 9/44505 |
| | | | 719/310 |
| 2005/0060158 A1 | 3/2005 | Endo et al. | |
| 2009/0003663 A1* | 1/2009 | Webster | G06K 9/00154 |
| | | | 382/119 |
| 2011/0149059 A1* | 6/2011 | Alberth | G06F 3/011 |
| | | | 348/77 |
| 2013/0197674 A1 | 8/2013 | Lowry | |
| 2013/0219417 A1* | 8/2013 | Gilson | H04N 21/258 |
| | | | 725/12 |
| 2013/0238540 A1* | 9/2013 | O'Donoghue | G06Q 30/0254 |
| | | | 706/46 |
| 2014/0317523 A1* | 10/2014 | Wantland | H04L 67/22 |
| | | | 715/744 |
| 2015/0134456 A1 | 5/2015 | Baldwin | |

OTHER PUBLICATIONS

Anonymous, "Video: Google Now detects accents, reacts accordingly", http://www.androidauthority.com/google-now-accents-515684/, Aug. 26, 2014, 2 pages.

Myslewski, "Apple files patent for iPhone enabled auto-adjustable auto interior", http://www.theregister.co.uk/2013/08/01/apple_adjustable_car_interior_patent/, Aug. 1, 2013, 4 pages.

Anonymous, "Nuance Communications", https://en.wikipedia.org/wiki/Nuance_Communications, Wikipedia, accessed Sep. 27, 2017, 7 pages.

Anonymous, "Speaker Recognition", https://www.google.com/url?sa=t&rct=j&q=&esrc=s&source=web&cd=11&ved=0ahUKEwi_2eXT9tDRAhXF8YMKHZY0Bo8QFghKMAo&url=https%3A%2F%2Fwww.fbi.gov%2Ffilerepository%2Fabout-us-cjis-fingerprints_biometrics-biometric-center-of-excellencessp ..., National Science and Technology Council (NSTC), accessed Sep. 27, 2017, 6 pages.

Kurtz, "Fingerprinting Mobile Devices Using Personalized Configurations", https://www.tu-braunschweig.de/Medien-DB/sec/pubs/2016-pets.pdf, Proceedings on Privacy Enhancing Technologies ; 2016 (1):4-19, 2016, 16 pages.

Tofel, "Apple adds individual voice recognition to "Hey Siri" in iOS 9", http://www.zdnet.com/article/apple-adds-individual-voice-recognition-to-hey-siri-in-ios-91, ZDNet, Sep. 11, 2015, 11 pages.

\* cited by examiner

AUTOMATED SETTING CUSTOMIZATION USING REAL-TIME USER DATA

BACKGROUND

The present invention relates generally to reconfigurable device settings and, more particularly, to automated device settings customization based on real-time user characteristic data.

As personal computing devices such as smart phones, tablets, portable computers, wearables and the like become more sophisticated, manufacturers are offering more configuration options to personalize the device to particular users. In an effort to automate personalization of computing devices, some systems have been configured to analyze a user's control signal input (keyboard input) to the computer and adjust the computing device's configuration to an optimal set of configuration parameters. Other systems have been proposed that enable a user to transfer preferred automobile settings from one automobile to another automatically based on information carried in a portable computing device.

As personal computing devices become more sophisticated, they also increasingly include voice recognition and facial recognition software. Advances in voice recognition software enable computing devices to recognize speech patterns including accents, volume of speech, speed of speech, etc. Moreover, advances in facial recognition technology enable computing devices to recognize physical features or characteristics of a person.

SUMMARY

In an aspect of the invention, a computer-implemented method includes: receiving, by a computing device, real-time user characteristic data; determining, by a user detection module of the computing device, whether the user is a known user of the computing device based on the real-time user characteristic data; identifying, by a pattern detecting module of the computing device, one or more characteristics of the user based on the real-time user characteristic data; determining, by a reconfiguration module of the computing device, a statistical confidence level of the one or more characteristics of the user; determining, by the reconfiguration module, that the statistical confidence level meets a predetermined threshold value; and automatically changing, by the reconfiguration module, a plurality of user configurable settings of the computing device based on the one or more characteristics of the user and in response to the determining that the statistical confidence level meets the predetermined threshold value.

In another aspect of the invention, there is a computer program product for automated device settings customization based on real-time user characteristic data. The computer program product comprising a computer readable storage medium having program instructions embodied therewith. The program instructions are executable by a computing device to cause the computing device to: receive real-time user audio data; determine whether the user is a known user of the computing device based on the real-time user audio data; identify one or more characteristics of the user based on the real-time user audio data; determine a statistical confidence level of the one or more characteristics of the user; determine that the statistical confidence level meets a predetermined threshold value; and automatically change at least one user configurable setting of the computing device based on the one or more characteristics of the user and in response to the determining that the statistical confidence level meets the predetermined threshold value, wherein the determining whether the user is a known user of the computing device based on the real-time user audio data and the identifying one or more characteristics of the user based on the real-time user audio data occur at the same time.

In another aspect of the invention, there is a system for automated device setting customization based on user characteristic data. The system includes a CPU, a computer readable memory and a computer readable storage medium associated with a computing device; program instructions to receive user characteristic data; program instructions to determine whether the user is a known user of the computing device based on the user characteristic data; program instructions to identify a characteristic of the user based on the user characteristic data; program instructions to determine a statistical confidence level of the characteristic of the user; program instructions to determine that the statistical confidence level meets a predetermined threshold value; program instructions to automatically change at least one user configurable setting of the computing device based on the characteristic of the user; program instructions to receive new user characteristic data; program instructions to identify a new characteristic of the user based on the new user characteristic data; program instructions to determine a new statistical confidence level of the new characteristic of the user identified based on the new user characteristic data; program instructions to determine that the new statistical confidence level meets a predetermined threshold value for the new user characteristic; and program instructions to automatically change the at least one user configurable setting of the computing device based on the new user characteristic and in response to the determining that the statistical confidence level meets the predetermined threshold value; wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
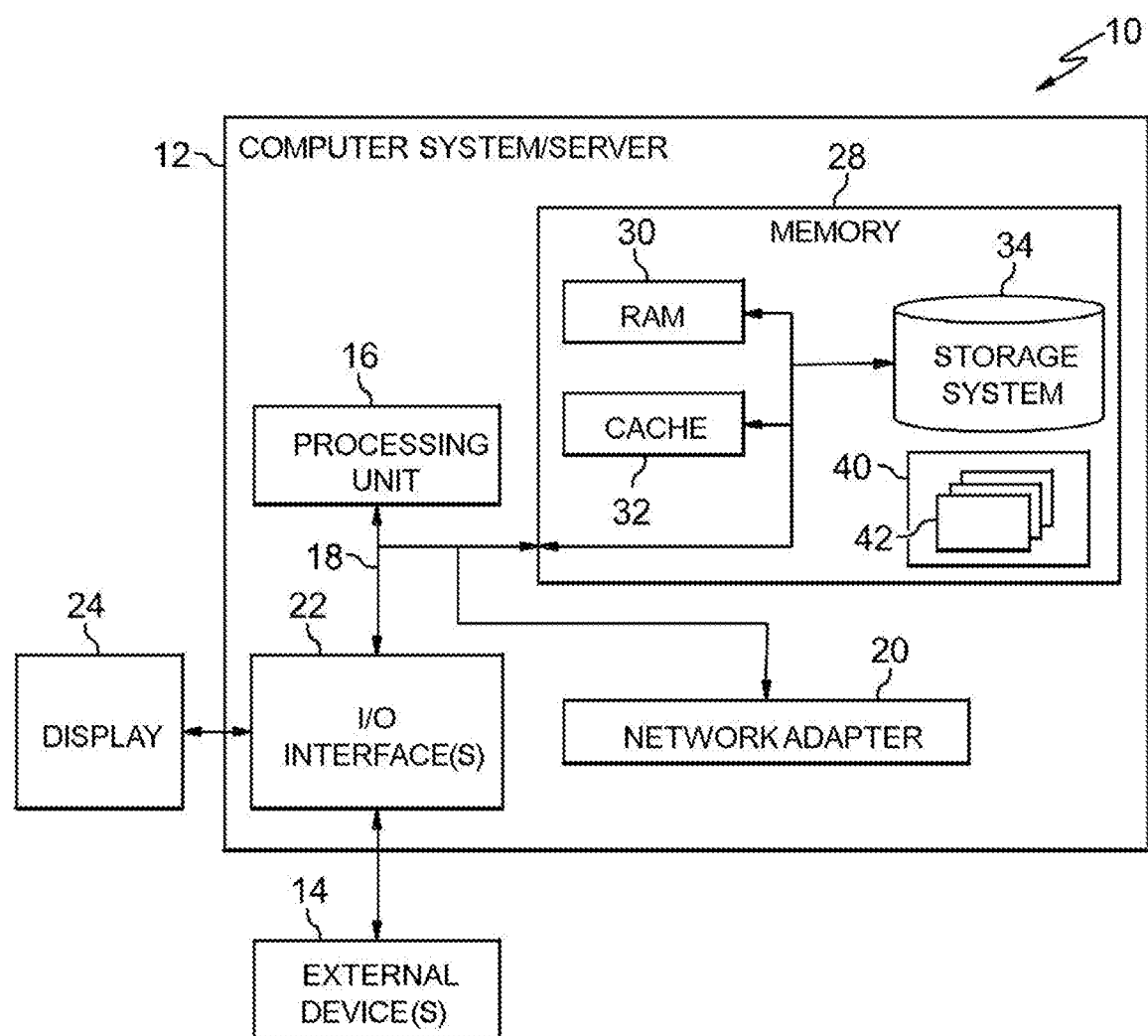
FIG. 1 depicts a computing infrastructure according to an embodiment of the present invention.

The present invention relates generally to reconfigurable device settings and, more particularly, to automated device settings customization based on real-time user characteristic data. In embodiments, a user computer device receives real-time user characterization data, such as voice data or visual data (e.g., camera data). The audio and/or visual data is passed to a pattern detection module and to a user detection module. In aspects, the pattern detection module and the user detection module work concurrently on the incoming audio and/or visual data. In embodiments, pattern detection module determines characteristics of a user (e.g., an accent of the user's voice or the fact that the user wears glasses) while the user detection module determines if the user has already used the system (e.g., already has a user profile saved on the user computer device). If the user has utilized the system before, the pattern detection module may update the user's profile based on the real-time audio and/or visual data. If the user has not utilized the system before, the pattern detection module may create and store a new user profile. In aspects, a user profile is created based on regional influence or cultural preferences associated with the user's accent.

In embodiments, a reconfiguration module determines a statistical confidence of one or more characteristics of the user (e.g., confidence percentage that the user is from a certain geographic region based on their accent). In aspects, if the statistical confidence meets a predetermined threshold value, and if one or more settings have not already been manually reconfigured or customized, then the reconfiguration module automatically customizes the one or more settings based on the real-time audio and/or visual data.

Manufacturers of personal computing device are increasingly offering more configuration options to personalize the device to particular users. One problem with many such devices out of the box is that a user may not know, nor care to discover, all the various settings available to be configured. Advantageously, embodiments of the invention provide improvements to the field of personal computing devices by enabling automated personalization of a computing device based on real-time user characteristic data sensed by the computing device. Efficiency of the computing device is improved by providing a method by which a user can automatically and simultaneously or concurrently customize multiple settings of out-of-the-box computing devices based on the user's voice or appearance, without the need for complicated tutorials or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
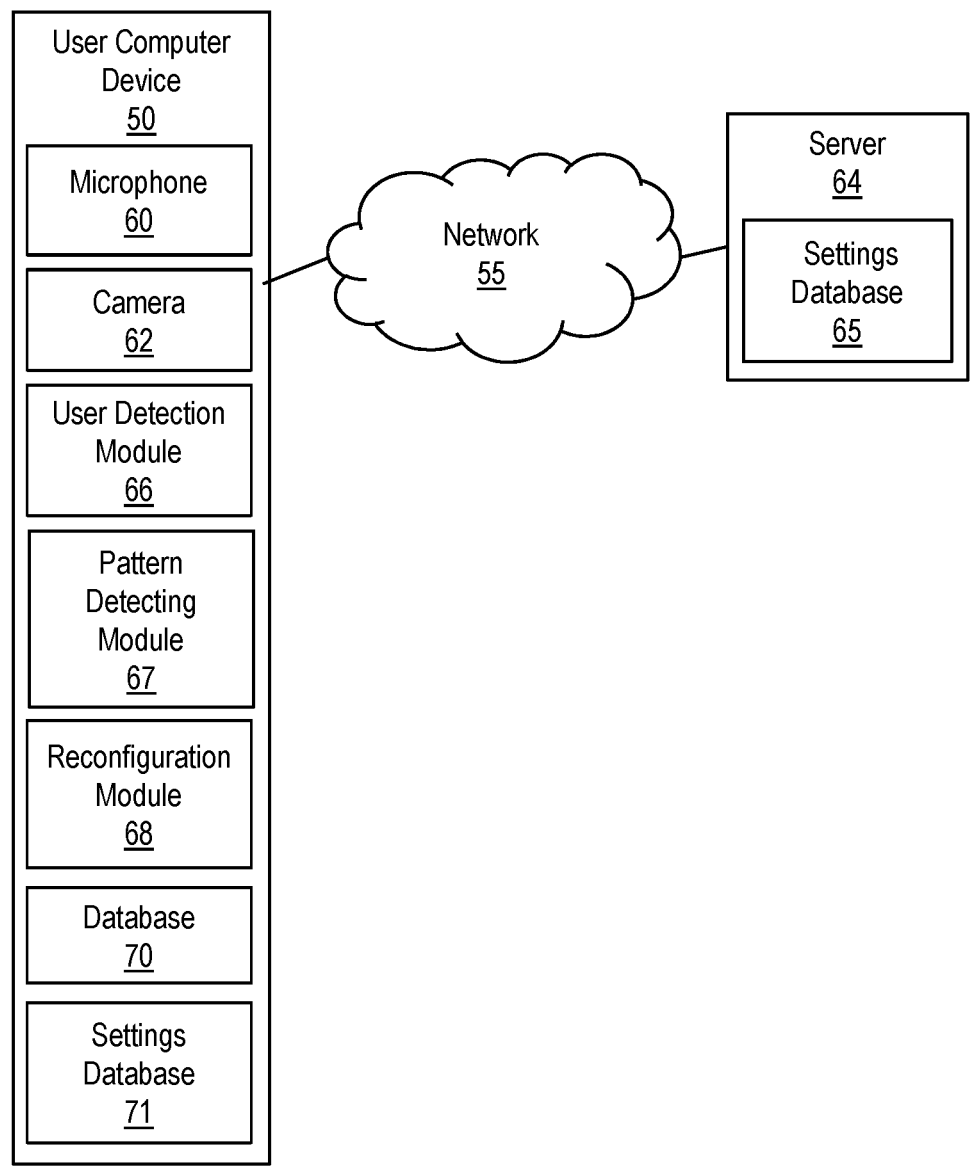
FIG. 2 shows an exemplary environment in accordance with aspects of the invention.

FIG. 2 shows an exemplary environment in accordance with aspects of the invention. The environment includes a user computer device 50, which may be connected to a network 55. The user computer device 50 may comprise a computer system 12 of FIG. 1, and may be connected to the network 55 via the network adapter 20 of FIG. 1. The user computer device 50 may be a personal computing device, such as a desktop computer, smartphone, laptop computer, tablet computer, wearable computer, or the like. In embodiments, the user computer device 50 comprises standard personal computing device equipment, including a microphone 60 and a camera 62.

The network 55 may be any suitable communication network or combination of networks, such as a local area network (LAN), a general wide area network (WAN), and/or a public network (e.g., the Internet). The user computer device 50 may be in communication with a remote server 64 via the network 55. In embodiments, remote server 64 is in the form of a provider server, such as a network provider including settings database 65.

Still referring to FIG. 2, a user detection module 66, a pattern detecting module 67, and a reconfiguration module 68 of the user computer device 50 are configured to perform one or more of the functions described herein, and may include one or more program modules (e.g., program module 42 of FIG. 1) executed by the user computer device 50. In embodiments, the user detection module 66 determines if the user has already utilized the user computer device 50 (i.e., the user is already known to the system), or if the user is new to the user computer device 50. In aspects, the user detection module 66 determines a voice print of the user and compares it to voice print data in a database 70 to determine whether there is a match (and thus the user is known to the system).

In embodiments, the pattern detecting module 67 is configured to identify user characteristics such as speech patterns and appearance of the user based on real-time user characteristic data (e.g., voice data and visual data) received by the user computer device 50. Embodiments of the invention require a user to "opt-in" to the data gathering steps required for the identification of user characteristics, wherein a user provides explicit permission for audio and visual data gathering. Voice and visual data gathering may be implemented in accordance with applicable privacy laws and may be discontinued at any time by a user who has revoked permission for voice and visual data gathering steps of the present invention. In aspects, the pattern detecting module 67 is configured to update a user profile with characteristic data, or create a new user profile including the user characteristic data, if the user detection module 66 determines that the user is new to the user computer device 50. In aspects, voice data received by the microphone 60 is sent to both the pattern detecting module 67 and the user detection module 66 concurrently. In aspects, visual data received by the camera 62 is sent to both the pattern detecting module 67 and the user detection module 66.

In embodiments, the reconfiguration module 68 is configured to determine a statistical confidence of the user characteristics determined by the pattern detecting module 67. By way of example, the reconfiguration module 68 may determine that a user is likely to have a particular accent with a certain degree of confidence (confidence percentage). In aspects, for each user characteristic determined by the pattern detecting module 67, the reconfiguration module 68 determines if the degree of confidence associated therewith meets a respective predetermined threshold value, determines if the threshold value has been reached previously, determines if settings associated with user characteristics have already been manually changed, and automatically customizes settings of the user computer device 50 based on the real-time user characteristic data when certain conditions have been met. In aspects the reconfiguration module 68 looks up one or more settings in a settings database 71 that are associated with the user characteristics that meet the threshold value, and implement changes to the settings based on instructions in the settings database 71.

In embodiments, the user computer device 50 may include additional or fewer components than those shown in FIG. 2. In embodiments, separate components may be integrated into a single computing component or module. Additionally, or alternatively, a single component may be implemented as multiple computing components or modules.

Figure 3:
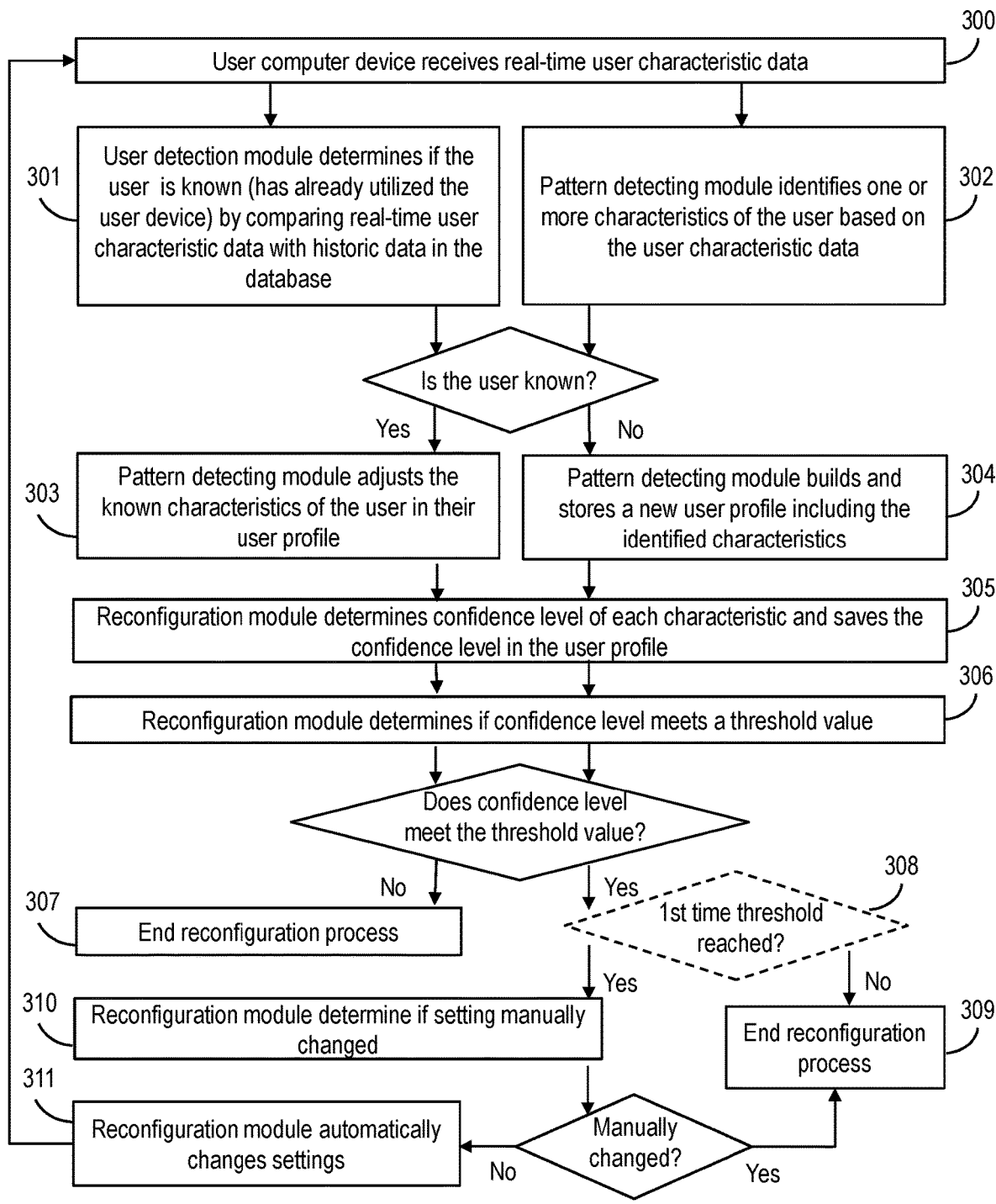
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300 a user computer device 50 receives real-time user characteristic data. In embodiments, the real-time user characteristic data is audio data and/or visual data. In aspects, audio data is received via the microphone 60 of the user computer device 50. In aspects, visual data is received from the camera 62 of the user computer device 50. In embodiments, the user characteristic data is received during an initial setup procedure of the user computer device 50, such as during the initial configuration of a virtual assistant (e.g., Google Assistant by Google® or Ski® by Apple Inc.) of the user computer device 50. In aspects, a user will be presented with a prompt requesting the visual data and/or audio data (voice data) from the user. Such a prompt may request the user to voice a particular word, phrase or set of words or phrases, for example.

At step 301, the user characteristic data received at step 300 is fed to the user detection module 66, and the user detection module 66 determines if the user is a known user (e.g., the user has already utilized the user computer device 50) or the user is a new user. In aspects, the user detection module 66 determines a voice print of the user from audio data received at step 300, and compares the voice print of the user to voice print data in the database 70 in order to determine if there is a match. The term voice print as used herein refers to a set of measurable characteristics of a human voice that uniquely identify an individual. In aspects, if the user detection module 66 determines a match between the voice print of the current user and a stored voice print in the database 70, the user detection module 66 then determines that the current user is known to the user computer device 50. In contrast, if the user detection module 66 determines that there is no match between the voice print of the current user and a stored voice print, then the user detection module 66 determines that the current user is a new user.

Still referring to step 301, in aspects, the user detection module 66 utilizes a facial recognition tool to analyze visual data received at step 300, and compares facial recognition data from the facial recognition tool to visual data in the database 70 in order to determine if there is a match. In aspects, if the user detection module 66 determines a match between the facial recognition data of the current user and a stored visual data in the database 70 (e.g., stored facial recognition data associated with a user), the user detection module 66 then determines that the current user is known to the user computer device 50. In contrast, if the user detection module 66 determines that there is no match between the facial recognition data of the current user and a stored visual data, then the user detection module 66 determines that the current user is a new user.

At step 302, the user characteristic data received at step 300 is fed to the pattern detecting module 67, and the pattern detecting module 67 identifies characteristics of the user based on the user characteristic data. In embodiments, the pattern detecting module 67 detects speech patterns of the user based on audio data received at step 300, including, for example, user voice volume, user accent, user speech speed, and user speech cadence. It should be understood that a variety of speech pattern detecting tools may be utilized in the implementation of step 302. In embodiments, the pattern detecting module 67 detects visual patterns of the user based on visual data received at step 300, including, for example, user appearance data (e.g., the presence of eye glasses on the wearer's face).

In embodiments, the user computer device 50 sends real-time user characteristic data simultaneously or concurrently to the user detection module 66 and the pattern detecting module 67. In aspects, steps 301 and 302 are performed simultaneously or concurrently by the user computer device 50.

At step 303, if the user is determined to be a known user in accordance with step 301, the pattern detecting module 67 adjusts the user profile of the user in the database 70 with the one or more characteristics identified at step 302, if necessary. In this way, a user profile of the user can be continuously improved to obtain the most accurate user profile based on incoming user characteristic data (e.g., speech pattern data).

At step 304, if the user is determined to be a new user in accordance with step 301, the pattern detecting module 67 builds and stores a new user profile including the user's characteristics identified at step 302. In embodiments, the new user profile includes speech patterns of the user based on the audio data including, for example, user voice volume, user accent, user speech speed, and user speech cadence. In embodiments, the new user profile includes visual patterns of the user based on the visual data including, for example, the presence of eyewear on the user's face.

At step 305, the reconfiguration module 68 determines a statistical confidence level of each characteristics of the user identified at step 302, and saves the statistical confidence level with the user's profile in the database 70. For example, the reconfiguration module 68 may determine that a user has an accent indicating they are from Scotland, with a statistical confidence level of 80% based on historic speech pattern data in the database 70 and the quantity of audio data received at step 300. It should be understood that various method of calculating confidence levels may be utilized in the implementation of step 305.

At step 306, the reconfiguration module 68 determines if the statistical confidence level determined at step 305 meets a predetermined threshold value for one or more of the user characteristics identified a step 302. The database 70 may include a table of threshold values for each characteristic identified by the pattern detecting module 67 at step 302. For example, the reconfiguration module 68 may determine that a threshold value for a Scottish accent is set at an 80% or greater confidence level. In aspects, the threshold values are accessible by a user of the user computer device 50, and may be adjusted by the user.

At step 307, if the confidence level for the characteristics of the user identified at step 302 does not meet the threshold value at step 306, then the reconfiguration module 68 ends the reconfiguration process. For example, if the reconfiguration module 68 determines that a user has a local regional accent with a statistical confidence level of 50% at step 305, but the threshold value for the local regional accent is set at a 60% confidence level, then the reconfiguration module 68 would end the reconfiguration process at step 308.

Optionally, at step 308, if the confidence level for one or more of the characteristics of the user identified at step 302 does meet the threshold value at step 307, then the reconfiguration module 68 determines if the one or more characteristics is meeting the threshold value for the first time. For example, if the reconfiguration module 68 determines that a user has a local regional accent with a statistical confidence level of 70% at step 305, and the threshold value for the local regional accent is set at a 60% confidence level, then the reconfiguration module 68 may determine at step 308 that this is the first instance that the local regional accent characteristic has met the threshold value of 60%.

At step 309, if the reconfiguration module 68 determines that the characteristics of the user have previously met the associated threshold value at step 308, then the reconfiguration module 68 ends the reconfiguration process. For example, if a characteristic identified at step 302 is a local regional accent, and the reconfiguration module 68 determines that the local regional accent characteristic has previously met the threshold value of the 60% confidence level, then the reconfiguration module 68 would end the reconfiguration process at step 309.

At step 310, if the confidence level meets the threshold value in accordance with step 306 for one or more characteristics, the reconfiguration module 68 determines whether one or more associated settings of the user computer device 50 have been manually changed or adjusted by a user. The term setting as used herein refers to functionality enabling the modification of features or behaviors of an application. In embodiments, step 310 is performed only if the reconfiguration module 68 determines that one or more identified characteristic of the user have met the associated threshold value for the first time in accordance with step 308. Settings of the user computer device 50 may be user configurable settings (settings that may be accessed and adjusted by the user through a user interface) or may be non-user configurable settings (settings that are not accessible by a user in the course of normal operation of the user computer device 50). For example, the user computer device 50 may include a user configurable navigation setting that may be adjusted to provide a first set of directions for non-local residents ("non-local resident" setting), and a second set of directions for local residence ("local resident" setting), whereby directions for non-local residents will be biased toward main roads and tourist locations and directions for local residents will be biased towards back roads that avoid high traffic areas. In this example, if a user has already manually adjusted the navigational setting to a "local resident" setting, the reconfiguration module 68 will determine that the setting was already manually changed at step 310.

When the reconfiguration module 68 determines at step 310 that one or more settings of the user computer device 50 (associated with one or more characteristic of the user) have been manually changed by the user, then the reconfiguration module 68 ends the reconfiguration process according to step 309.

At step 311, when the reconfiguration module 68 determines at step 310 that one or more settings of the user computer device 50 associated with one or more characteristic of the user have not been manually changed by the user, then the reconfiguration module 68 automatically changes the one or more settings of the user computer device 50 based on rules in the database 70. For example, if the user characteristic identified at step 302 is a local regional accent, and an associated navigational tool has not been previously manual changed by a user (the navigational tool is set at its default "non-local resident" setting), then the reconfiguration module 68 will automatically switch the navigation tool from its default "non-local resident" setting to the "local resident" setting. In embodiments, the user computer device 50 may receive rules from a settings database 65 of a remote server 64, such as a network provider server, through the network 55. In embodiments, the reconfiguration module 68 automatically changes a plurality of user configurable settings of the user computer device 50 at step 311 based on one or more characteristics of the user identified at step 302. In aspects, the reconfiguration module 68 automatically changes only one user configurable setting of the user computer device 50 at step 311. In embodiments, the process of FIG. 3 may be repeated continuously or periodically.

accent associated with non-English speakers); eyewear usage (e.g., the user is wearing glasses); audio age indicators (e.g., audio sounds indicative of age); and audio volume indicators (e.g., the volume of a user's voice is categorized from lowest to highest in either category A, B, or C).

In a first exemplary scenario, a mobile device (user computer device 50) being utilized by a user for the first time runs the settings customization process illustrated in FIG. 3. In this scenario, an initial use of the user computer device 50 triggers the user computer device 50 to obtain real-time user characteristic data in the form of audio data of the user (voice data) obtained through the microphone 60, and visual data of the user (digital photographs of the user's face) through the camera 62. The user characteristic data is received after the user computer device 50 prompts a user to speak into the microphone 60 and to position the user computer device 50 such that the camera 62 can take a picture of the user's face. The audio data and visual data is

| Setting | User Characteristic | Setting Changes |
| --- | --- | --- |
| Navigational Tool Settings | Regional Accent A | System changes navigation settings so that users determined to be local to a region based on accent will receive navigational directions biased towards back roads that avoid high traffic areas. |
| | Regional Accent B | System changes navigation settings so that users determined to be local to a region based on accent receive navigational directions biased towards main roads and tourist locations. |
| Speed of Voice Assistant Settings | Non-native Language Speaker | System changes speed setting for a computing device voice assistant from a standard speed to a slower speed when a user's accent indicatives the user is a non-native language speaker. |
| Calendar Settings | European Accent | System changes calendar settings to be in the European format (e.g., day, month, year). |
| | Regional Accents A-Z | System changes calendar settings to include official holidays consistent with region associated with user's accent. |
| Time Settings | Audio Use of Military Time | System changes settings to show military time configuration instead of standard time configuration when the user's use of military time is detected in voice data (e.g., standard 2:00AM = 0200 hours military). |
| Units of Measure Settings | Regional Accents A-M | System changes unit of measure settings to be in the imperial system format based on users with accents from regions A-D. |
| | Regional Accents N-Z | System changes unit of measure settings to be in the metric system format based on users with accents from regions E-Z. |
| Font Settings | Eyewear Present/Absent | System changes font style or size based on visual eyewear indicator (e.g., a user's glasses are present or absent). |
| | Audio Age Indicators A-C | System changes font style or size based on audio age indicators. |
| Spelling Settings | Regional Accents A-M | System changes spelling settings from American English to British English spellings when user's accent is consistent with a British English speaking region. |
| | Regional Accents N-Z | System changes spelling settings from British English to American English spellings when user's accent is consistent with a British English speaking region. |
| Speaker Volume Settings | Audio Volume Indicators A-C | System changes volume setting to be louder or quieter to match volume category of user (e.g., loud user = computing device volume is increased; quieter user = computing device volume is decreased). |

The Table above depicts an exemplary table of rules for user characteristics and associated settings. Settings or user characteristics depicted the Table may be utilized in the implementation of the method of FIG. 3.

Examples of settings that may be automatically changed by the user computer device 50 in accordance with step 311 of FIG. 3 include: navigational tool settings; speed of voice assistant setting (settings for changes a speed at which a voice assistant speaks to a user); calendar settings; time settings; unit of measure settings; font settings; spelling settings and speaker volume settings. Examples of user characteristics that may be identified in accordance with step 302 of FIG. 3 include: a user's accent (e.g., local accent, regional accent); indications that the user is a non-native language speaker (e.g., the user is speaking English with an then concurrently fed to the user detection module 66 and the pattern detecting module 67 for analysis in accordance with steps 301 and 302 of FIG. 3.

In this exemplary scenario, the pattern detecting module 67 detects that the user has a regional accent associated with a Region A based on the audio data, and detects that the user is wearing glasses based on the visual data, in accordance with step 302 of FIG. 3. Since the user computer device 50 is running through an initial customization process, the user is not yet known to the user computer device 50, and the pattern detecting module 67 builds a new user profile in accordance with step 304 of FIG. 3. In accordance with step 305 of FIG. 3, the user computer device 50 then determines that the user has an accent associated with Region A (Regional Accent A) with an 80% level of confidence, and determines that the user is wearing glasses (Eyewear Present/Absent) with a 95% level of confidence. In this scenario, the threshold value for determining an accent associated with Region A is 75%, and the threshold value for determining that the user is wearing glasses is 90%.

In this exemplary scenario, the user computer device 50 determines that this is the first time that the Region A threshold value of 75% has been met or acceded, in accordance with step 308 of FIG. 3. Conversely, the characteristic of "Eyewear Present" is configured to be checked iteratively, and is not subject to step 308 of FIG. 3. The reconfiguration module 68 then determines that the user has not yet manually changed any settings associated with the characteristics "Regional Accent A" or "Eyewear Present", in accordance with step 310 of FIG. 3. In accordance with step 311 of FIG. 3, the reconfiguration module 68 then automatically changes settings associated with "Regional Accent A" and "Eyewear Present", including changes to navigational tools settings, calendar settings, units of measure settings, and spelling settings. More specifically, in this example, the user computer device 50 changes: navigational tool settings so that the user, who is local to Region A, is provided with navigational directions biased towards back roads in order to avoid high traffic areas; calendar setting to include holidays consistent with Region A; units of measure settings from the metric system to the imperial system; and spelling settings from American English to British English spellings.

In this first scenario, the user profile of the user now includes information indicating that the user utilizes glasses in accordance with step 304 of FIG. 3. The user computer device 50 obtains real-time user characteristic data on a periodic basis, whereby the pattern detecting module 67 identifies an absence of eyewear at step 302 of FIG. 3, based on new visual data. The pattern detecting module 67 next determines that the user is known to the user computer device 50 in accordance with step 301 of FIG. 3. The reconfiguration module 68 then: determines with a confidence level of 95% that the user is not wearing glasses in accordance with step 305 of FIG. 3; determines that the characteristic "Eyewear Absent" has met the threshold value of 90%; determines that the setting "Font Settings" has not been manually changed in accordance with step 310 of FIG. 3; and automatically changes the "Font Settings" to be a greater size based on the characteristics of the user (i.e., an eyeglass wearer is not currently wearing glasses). In this scenario, the method steps of FIG. 3 may be repeated periodically or based on a predetermined trigger, such that the "Font Settings" may be automatically customized based on real-time user characteristic data.

To the extent the aforementioned implementations collect, store, or employ personal information or characteristics of individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption techniques.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for automated device setting customization based on real-time user characteristic data. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a computing device, real-time user characteristic data;
sending, by the computing device, the real-time user characteristic data concurrently to a user detection module and a pattern detecting module;
identifying, by the user detection module of the computing device, the user as a known user of the computing device based on the real-time user characteristic data;
determining, by the pattern detecting module, speech patterns and visual patterns of the user based on the real-time user characteristic data;
identifying, by the pattern detecting module of the computing device, one or more user characteristics based on the speech patterns and the visual patterns of the user, wherein the user characteristics are associated with at least one category of user;
determining, by a reconfiguration module of the computing device after identifying the user as a known user of the computing device, a statistical confidence level of the one or more user characteristics;
determining, by the reconfiguration module, that the one or more user characteristics are associated with the user when the statistical confidence level meets a predetermined threshold value;
updating, by the pattern detecting module, a user profile of the user with the one or more user characteristics;
determining, by the reconfiguration module, a plurality of user configurable device settings for functions of the computing device associated with the at least one category of user in a settings database; and
automatically changing, by the reconfiguration module, the plurality of user configurable device settings of the computing device based on the at least one category of user associated with the one or more user characteristics and in response to the determining that the statistical confidence level meets the predetermined threshold value.

2. The method of claim 1, further comprising determining, by the reconfiguration module, that the plurality of settings have not been manually changed, wherein the automatically changing the plurality of settings occurs after the determining that the plurality of settings have not been manually changed.

3. The method of claim 1, wherein the one or more user characteristics comprises one or more selected from the group consisting of: a user accent; a user speech cadence; and a user speech speed; and the category of user is selected from the group consisting of: a native language speaker; a non-native language speaker; a local resident and a non-local resident.

4. The method of claim of claim 1, wherein the plurality of user configurable settings of the computing device comprises a plurality of settings selected from the group consisting of: a navigational tool setting; a speed setting for a voice assistant of the computing device; calendar settings; time settings; unit of measure settings; font settings; spelling settings and speaker volume settings.

5. The method of claim 1, wherein the real-time user characteristic data is selected from the group consisting of: audio data and visual data.

6. The method of claim 1, further comprising: determining, by the reconfiguration module, that the statistical confidence level meets the predetermined threshold value for a first time during an operation of the computing device, wherein the automatically changing the plurality of settings occurs after the determining that the statistical confidence level meets the predetermined threshold value for the first time.

7. The method of claim 1, wherein the user characteristic data comprises audio data and the identifying the user as a known user of the computing device comprises:
determining, by the pattern detecting module, a voice print of the user from the audio data; and
comparing, by the pattern detecting module, the voice print of the user with voice print data in a user profile to determine that the voice print matches a stored voice print within the user profile.

8. The method of claim 1, wherein the identifying the user as a known user of the computing device, the identifying the one or more user characteristics based on the real-time user characteristic data, the determining the statistical confidence level of the one or more user characteristics, the determining that the one or more user characteristics are associated with the user when the statistical confidence level meets a predetermined threshold value, and the automatically changing the plurality of user configurable settings of the computing device, are performed as part of an initial setup procedure of the user computer device.

9. The method of claim 1, further comprising:
presenting, by the computing device, a prompt requesting the real-time user characteristic data from the user;
wherein the automatically changing the plurality of user configurable settings of the computing device is further based on determining, by the computing device, that the user has not yet manually changed one or more of the plurality of user configurable settings;
wherein a user detection module of the computing device implements the identifying the user, and concurrently, a pattern detecting module of the computing device implements the identifying the one or more user characteristics;
wherein the category of user is selected from the group consisting of: a native language speaker; a non-native language speaker; a local resident and a non-local resident; and
wherein the steps of the method of claim 1 are performed as part of an initial setup procedure of the user computer device.

10. A computer program product for automated device settings customization based on real-time user characteristic data, the computer program product comprising a computer readable storage medium having program instructions embodied therewith, the program instructions executable by a computing device to cause the computing device to:
receive real-time user audio data;
send the real-time user audio data concurrently to a user detection module and a pattern detecting module;
identify the user as a known user of the computing device based on the real-time user audio data;
determine speech patterns of the user based on the real-time user audio data;
identify one or more user characteristics based on the speech patterns, wherein the user characteristics are associated with a category of user;
determine a statistical confidence level of the one or more user characteristics after identifying the user as a known user of the computing device;
determine that the one or more user characteristics are associated with the user when the statistical confidence level meets a predetermined threshold value;
update a user profile of the user with the one or more user characteristics;
determine a plurality of user configurable device settings for functions of the computing device associated with the category of user in a settings database; and
automatically change the plurality of user configurable device settings of the computing device based on the category of user in a settings database, and in response to the determining that the statistical confidence level meets the predetermined threshold value,
wherein the identifying the user as a known user of the computing device based on the real-time user audio data and the identifying one or more user characteristics based on the real-time user audio data occur at the same time.

11. The computer program product of claim 10, wherein the program instructions further cause the computing device to determine that the at least one user configurable setting has not been manually changed, wherein the automatically changing the plurality of settings occurs after the determining that the plurality of settings have not been manually changed.

12. The computer program product of claim 10, wherein:
the one or more user characteristics comprises one or more selected from the group consisting of: user voice volume; user accent; user speech cadence; and user speech speed; and
the at least one user configurable setting of the computing device comprises one or more settings selected from the group consisting of: a navigational tool setting; a speed setting for a voice assistant of the computing device; calendar settings; time settings; unit of measure settings; font settings; spelling settings and speaker volume settings.

13. The computer program product of claim 10, wherein the category of user is selected from the group consisting of: a native language speaker; a non-native language speaker; a local resident and a non-local resident; and the program instructions further cause the computing device to:

update a user profile of the user with the one or more user characteristics; and present a prompt requesting the real-time user audio data from the user, wherein the presenting the prompt and the receiving the real-time audio data are part of an initial setup procedure of the user computer device.

14. The computer program product of claim 10, wherein the program instructions further cause the computing device to determine that the statistical confidence level meets the predetermined threshold value for a first time, wherein the automatically changing the at least one user configurable setting occurs after the determining that the statistical confidence level meets the predetermined threshold value for the first time.

15. The computer program product of claim 10, wherein the identifying the user as a known user of the computing device comprises:

determining a voice print of the user from the audio data; and comparing the voice print of the user with voice print data in a user profile to determine that the voice print matches a stored voice print within the user profile.

16. A system for automated device setting customization based on user characteristic data, comprising:

a CPU, a computer readable memory and a computer readable storage medium associated with a computing device;

program instructions to receive user characteristic data;

program instructions to send the real-time characteristic data concurrently to a user detection module and a pattern detecting module;

program instructions to determine whether the user is a known user of the computing device based on the user characteristic data;

program instructions to determine speech patterns and visual patterns of the user based on the real-time characteristics data;

program instructions to identify a user characteristic based on the speech patterns and the visual patterns of the user, wherein the user characteristics are associated with a category of user;

program instructions to determine a statistical confidence level of the user characteristic after the determining whether the user is a known user of the computing device;

program instructions to determine that the statistical confidence level meets a predetermined threshold value;

program instructions to update a user profile of the user with the user characteristic;

program instructions to determine a plurality of user configurable device settings for functions of the computing device associated with the category of user in a settings database; and program instructions to automatically change the plurality of user configurable device settings of the computing device based on the category of user associated with the user characteristic;

program instructions to receive new user characteristic data;

program instructions to identify a new characteristic of the user based on the new user characteristic data;

program instructions to determine a new statistical confidence level of the new characteristic of the user identified based on the new user characteristic data;

program instructions to determine that the new statistical confidence level meets a predetermined threshold value for the new user characteristic; and program instructions to automatically change the at least one of the plurality of user configurable device settings of the computing device based on the new user characteristic and in response to the determining that the statistical confidence level meets the predetermined threshold value;

wherein the program instructions are stored on the computer readable storage medium for execution by the CPU via the computer readable memory.

17. The system of claim 16, wherein:

the user characteristic is selected from the group consisting of: user voice volume; user accent; user speech cadence; and user speech speed; and the at least one user configurable setting of the computing device comprises one or more settings selected from the group consisting of: a navigational tool setting; a speed setting for a voice assistant of the computing device; calendar settings; time settings; unit of measure settings; font settings; spelling settings and speaker volume settings.

18. The system of claim 16, wherein the category of user is selected from the group consisting of: a native language speaker; a non-native language speaker; a local resident and a non-local resident.

* * * * *